United States Patent [19]

Härtel et al.

[11] Patent Number: 5,315,867
[45] Date of Patent: May 31, 1994

[54] APPARATUS FOR MEASURING THE FRACTION OF LIQUID FUEL IN A FUEL TANK

[75] Inventors: Günter Härtel, Neuss; Karl-Heinrich Lösing, Alpen; Armin Schürfeld, Meerbusch; Johann Blasczyk, Neuss; Harald Kerkmann, Düsseldorf, all of Fed. Rep. of Germany

[73] Assignee: Pierburg GmbH, Neuss, Fed. Rep. of Germany

[21] Appl. No.: 850,399

[22] Filed: Mar. 11, 1992

[30] Foreign Application Priority Data

Mar. 11, 1991 [DE] Fed. Rep. of Germany ....... 4107787
Jun. 27, 1991 [DE] Fed. Rep. of Germany ....... 4121185

[51] Int. Cl.⁵ .................... G01F 17/00; G01F 23/14
[52] U.S. Cl. ................................... 73/149; 73/290 V
[58] Field of Search ................ 73/149, 290 V, 290 R

[56] References Cited

U.S. PATENT DOCUMENTS

| | | | |
|---|---|---|---|
| 3,585,861 | 6/1971 | Keng | 73/149 |
| 4,167,874 | 9/1979 | Grant | 73/290 R |
| 4,561,298 | 12/1985 | Pond | 73/149 |
| 4,649,746 | 3/1987 | Snow | 73/290 R |
| 4,713,966 | 12/1987 | Thyren et al. | 73/149 |
| 4,770,033 | 9/1988 | Nicolai | 73/149 |
| 4,808,161 | 2/1989 | Kamen | 73/149 |
| 4,826,482 | 5/1989 | Kamen | 73/149 |
| 4,840,064 | 6/1989 | Fudim | 73/149 |
| 5,022,261 | 6/1991 | Wolfson et al. | 73/149 |
| 5,167,155 | 12/1992 | Rodgers | 73/290 R |

FOREIGN PATENT DOCUMENTS 3913096 2/1990 Fed. Rep. of Germany.
2060911 5/1981 United Kingdom.

*Primary Examiner*—Hezron E. Williams
*Assistant Examiner*—G. Dombroske
*Attorney, Agent, or Firm*—Ladas & Parry

[57] ABSTRACT

The quantity of fuel in a fuel tank 1 is measured by determining the displacement of a membrane 19 and pressure values from a sensor 13. The displacement values of the membrane are representative of volume changes in a gas chamber in the tank 1 while the pressure values in the sensor 13 are representative of the pressure of the gas chamber. With these values, the fuel content in the gas tank can be determined from the general equation of state of an ideal gas. In order to displace the membrane 19, an electric motor 20 drives a step down transmission 25 which in turn drives a spindle mechanism 22 which is coupled to the membrane 19.

23 Claims, 5 Drawing Sheets

APPARATUS FOR MEASURING THE FRACTION OF LIQUID FUEL IN A FUEL TANK

FIELD OF THE INVENTION

The invention relates to apparatus for measuring the fraction of liquid fuel in a fuel tank.

BACKGROUND AND PRIOR ART

DE-PS 697,341 discloses a device based on the principle of determining the fraction of liquid fuel in a fuel tank from a piston displacement and the pressure change in the gas-filled tank space which results from this displacement. In this device, the piston is brought to a defined position by manual operation against the action of a spring, from which it is displaced by the spring force during measurement.

A similar device is disclosed in DE C2 29 53 903, in which the piston is displaced from a defined position by an air motor which operates at a pressure above or below atmospheric pressure. This device includes pressure sensors and displacement sensors, whose output signals may also be introduced, as the case may be, into an electronic control device for further processing.

Devices with manual displacement of the piston are out-of-date, and the displacement of the piston by means of an air motor takes up a large space, and can only be connected to the gas-filled tank space. Hence, such devices are not currently in use.

SUMMARY OF THE INVENTION

An object of the invention is to provide apparatus for measuring the fraction of liquid fuel in a fuel tank which operates without manual operation, has a small structural space requirement, and may be connected as desired to the fuel tank.

The apparatus according to the invention comprises a cylinder which is divided into first and second chambers by a membrane, the first chamber being connected to the fuel tank while the second chamber is connected to the atmosphere. A drive means acts on the membrane to produce displacement of the membrane in a direction to reduce the size of the first chamber, the displacement of said membrane being measured from an initial defined position to a displaced position produced by the drive means. The gas pressure in a gas space in the tank is measured by a pressure sensor means and during measurement, the communication of the fuel tank with ambient atmosphere is closed. The quantity of fuel in the fuel tank is determined from the pressure and displacement values measured based on the general equation of state of an ideal gas ($pV = MRT$). The invention is characterized in that the drive means comprises an electric drive motor connected to a step down transmission which in turn is drivingly connected to a drive spindle mechanism connected to the membrane to produce displacement thereof upon activation of the electric drive motor.

DETAILED DESCRIPTION OF PREFERRED EMBODIMENTS

Figure 1:
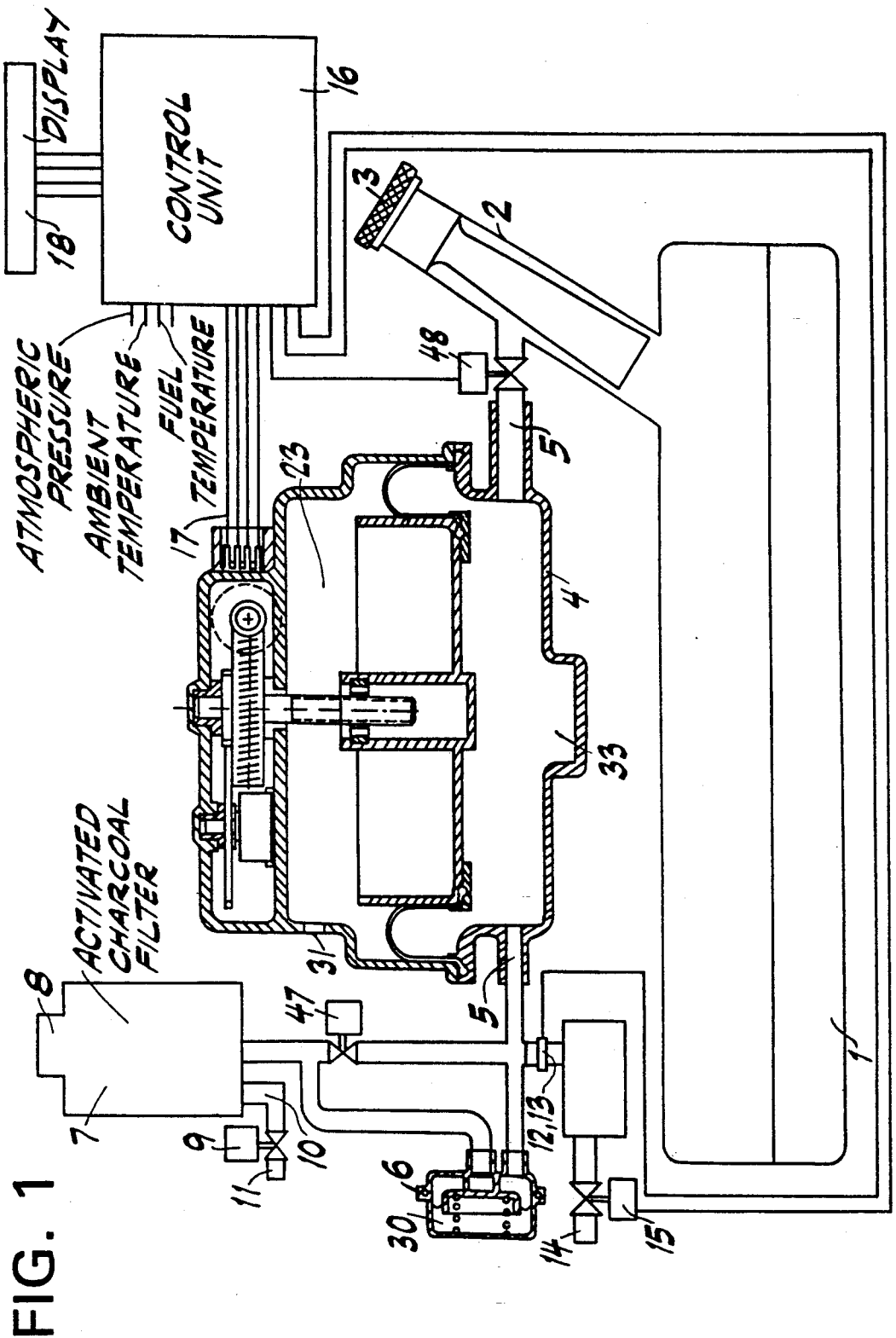
FIG. 1 is a schematic illustration of a device of the invention connected to the fuel tank of a motor vehicle.

FIG. 1 shows a fuel tank 1 provided with a filling tube 2 and a tank closure cover 3 as well as a cylinder 4 mounted above the tank 1. Cylinder 4 is shown on enlarged scale in FIGS. 2, 3 and 4 in slightly modified embodiments.

Fuel tank 1 is provided with a tank vent pipe 5, one section of which extends from tank filling tube 2 into cylinder 4 and a second section of the vent pipe extends from cylinder 4 through a pressure relief valve 6 into a tank 7 containing an activated charcoal filter. The tank 7 is connected to the atmosphere via a connection 8. In order to regenerate the activated charcoal filter in tank 7, a timing valve 9 selectively connects the tank 7 to a suction pump (not shown) via a connection duct 10 and a line 11, as a function of the operating conditions of the internal combustion engine.

A pressure sensor 13 is connected in a duct 12, to measure, on one side of the sensor, the pressure in fuel tank 1 as prevails in tank vent tube 5 and on its other side atmospheric pressure through a line 14. In a variation of this arrangement, the pressure sensor 13 and duct 12 can be arranged at a different location, for example, in proximity to tank filling tube 2. The atmospheric pressure may be applied to sensor 13 and its magnitude retained by means of a shut-off valve 15 located in line 14 between the air inlet to line 14 and sensor 13. Thus, the reference pressure of the pressure sensor 13 (atmospheric pressure at the beginning of measurement) is stored. Errors in measurement values due to changes in atmospheric pressure, for example, due to changes in elevation during measurements, are avoided in this way, and the stored volume of air acting on sensor 13 is sufficiently great in order to eliminate disturbing influences, which may arise as a result of the shut-off process, etc. In this regard, a buffer chamber is incorporated between sensor 13 and valve 15. Input signals are supplied to and processed in an electronic control unit 16 by means of signal lines 17, and output signals are produced by unit 16. The results of a calculation of fuel quantity in the tank and tank tightness, as will be described later, can be shown on a display 18 and/or be further processed as also will be described later.

Cylinder 4 is mounted outside fuel tank 1 in the tank vent pipe 5 between fuel tank 1 and pressure relief valve 6 or activated charcoal tank 7. In principle, the cylinder 4 may also be integrated into the fuel tank 1.

Figure 2:
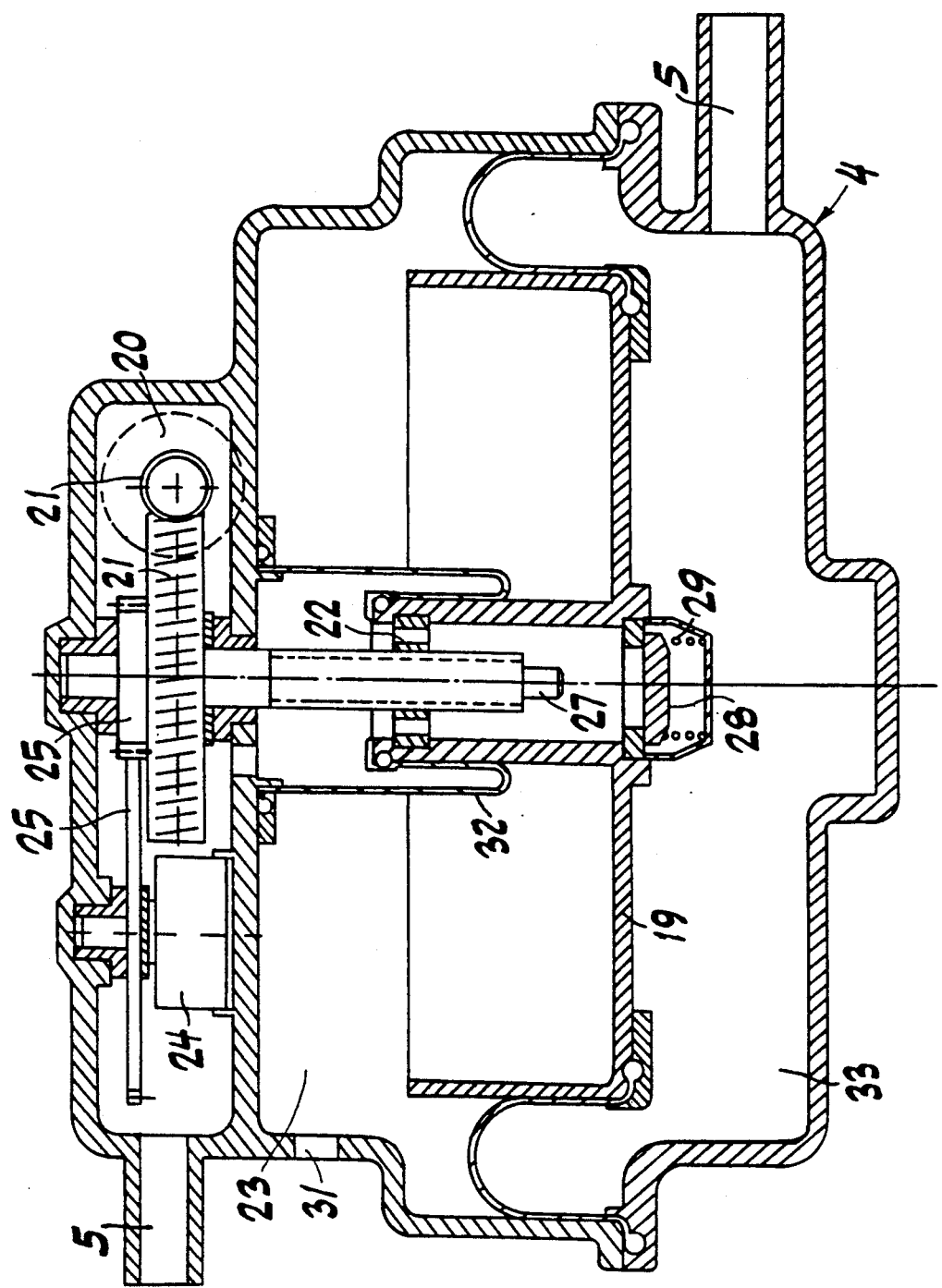
FIG. 2 shows, on enlarged scale, a detail of FIG. 1.

Referring to FIG. 2, cylinder 4 has a displaceable dividing means flexibly connected in the cylinder housing and designated as membrane 19. The dividing means or membrane 19 is displaceable by an electromotor drive consisting of an electric motor 20, a step-down transmission (for example, a worm gear) 21 and a spindle mechanism 22.

In order to reach a "measurement ready" position, membrane 19 is displaced into the vicinity of a stop position in the direction of a reduction of an upper chamber 23 formed in the housing above the membrane 19. The "measurement ready" position of the membrane is detected by a potentiometer 24 prior to reaching the stop position, the potentiometer being driven from spindle mechanism 22 by means of a step-down gearing 25 and indirectly detecting the travel position of membrane 19. The step-down ratio of the drive of potentiometer 24 is preferably selected such that the rotation of spindle mechanism 22 required for a complete travel of membrane 19 produces exactly one rotation of potentiometer 24. In the "measurement ready" position, a valve 28 is opened by a pin 27 against the force of a pressure spring 29. Thus, the sections of the tank vent tube 5 are in communication through open valve 28. A chamber 30 in pressure relief valve 6 (FIG. 1) is constantly connected to the atmosphere. In order to avoid an additional loading of activated charcoal tank 7 with the fuel vapor in tank vent tube 5, it is necessary to undertake volume displacement in chamber 23 in the travel of membrane 19 by means of a ventilation borehole 31 and to provide an elastic sleeve 32 or other suitable sealing means for avoiding leakage between the stationary wall of chamber 23 and membrane 19 (FIGS. 2 and 3).

Figure 3:
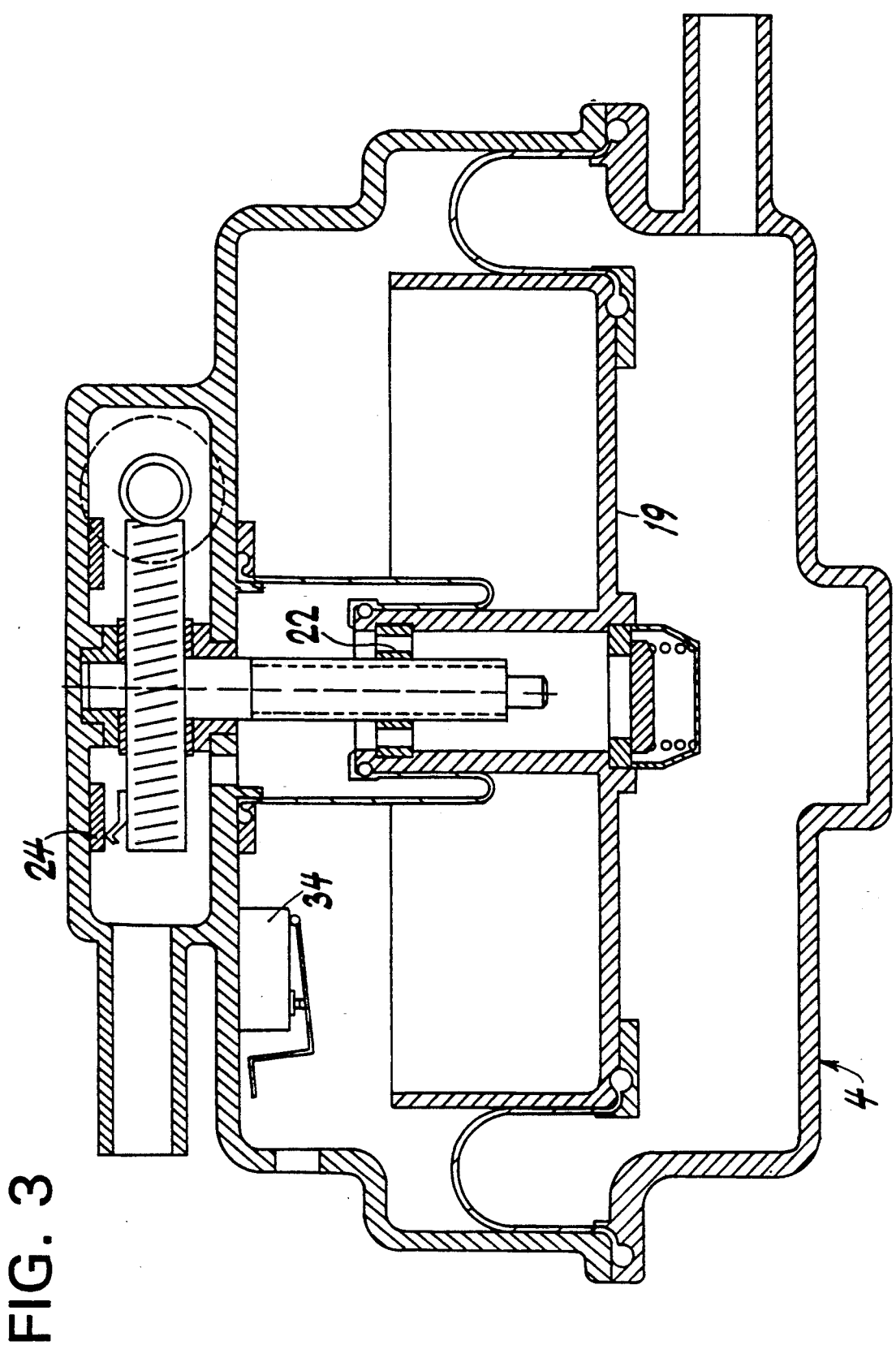
FIGS. 3 and 4 show alternative embodiments of the detail in FIG. 2.

Prior to commencement of measurement of the fuel content in the fuel tank, a small free travel of membrane 19 takes place, in the embodiments according to FIGS. 2 and 3, until pin 27 contacts valve 28. Accordingly, the tank pressure and the position of membrane 19 at the beginning of measurement ar determined simultaneously and membrane 19 travels in the direction to reduce the size of chamber 33 located below membrane 19.

FIG. 3 shows cylinder 4 with an arrangement of potentiometer 24 directly on the rotating part of spindle mechanism 22. Since the potentiometer 24 is driven over the complete travel of membrane 19 with several rotations, a final-position switch 34 is necessary in order to recognize the "measurement ready" position. In other respects cylinder 4 does not differ from the cylinder of FIG. 2.

Figure 4:
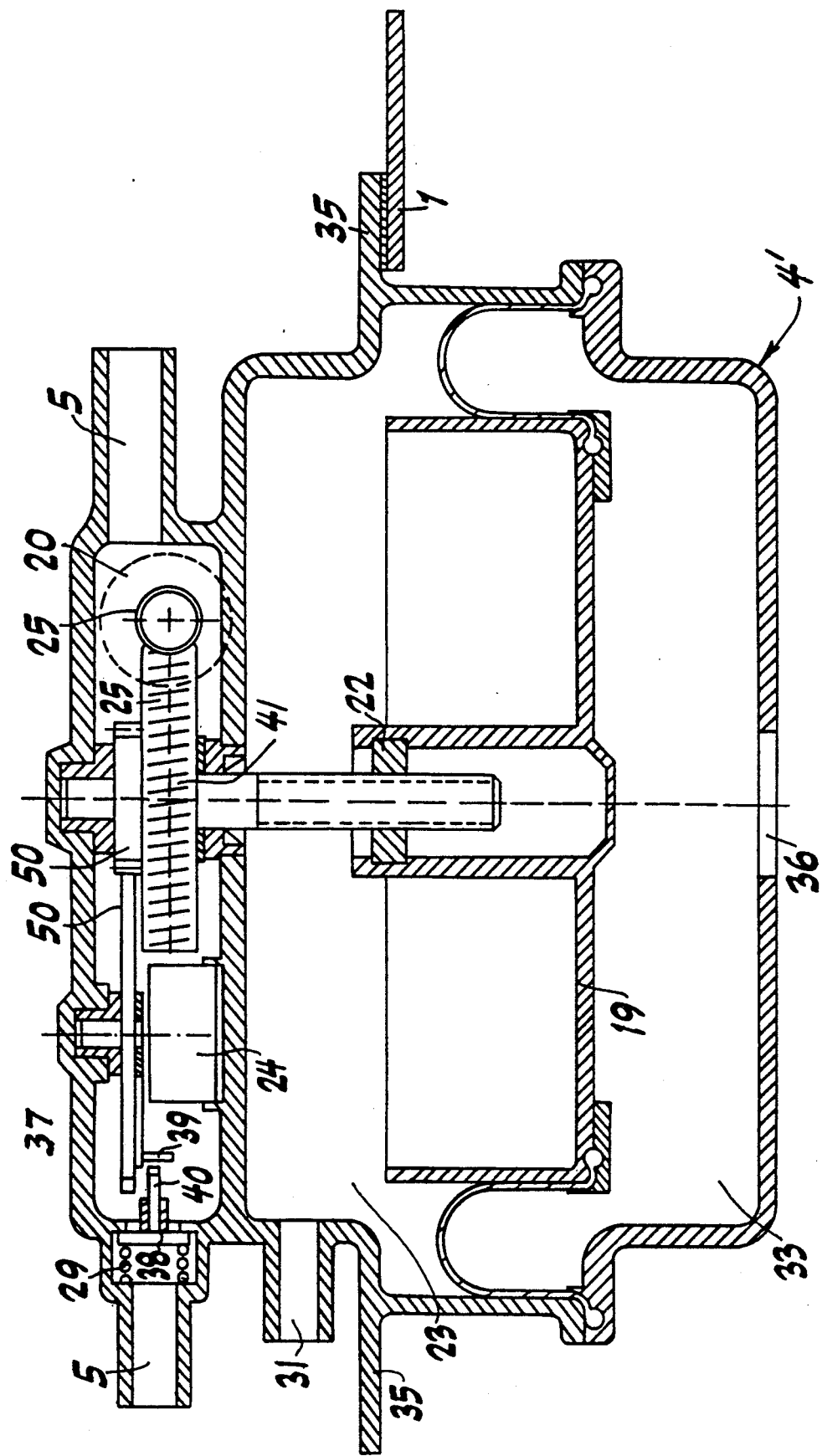

Cylinder 4' shown in FIG. 4 is designed for incorporation inside the fuel tank. Fuel tank 1 has an opening in its upper wall into which cylinder 4' is sealed by a flange 35. In contrast to the devices of FIGS. 1, 2 or 3, chamber 33 is not connected to the vent tube 5, but with the interior of fuel tank 1 by means of at least one borehole 36. The position of borehole 36 is preferably selected such that a good exchange of liquid fuel and tank atmosphere is assured. Depending on the arrangement of cylinder 4' on fuel tank 1, and depending on fuel content in the tank, chamber 33 may be filled with liquid fuel and/or with air and fuel vapor. The sections of the tank vent tube 5 are connected to an engine drive chamber 37 in this embodiment. A shut-off valve 38 serves to close the outlet of chamber 37 and has the same functions as the valve 28 of FIGS. 2 and 3. Hence, the open position of valve 38 is produced by mechanical engagement of the contour of a cam 39 with a sensing pin 40, and the valve 38 is held in its closed position by the force of pressure spring 29 when cam 39 is out of contact with sensing pin 40. Cam 39 is mechanically connected to the shaft of potentiometer 24. The contour of cam 39 is selected so that the valve 38 is opened when the membrane 19 is in "measurement ready" position, and is closed prior to commencement of the measurement travel. Chamber 23 is connected to the atmosphere by means of ventilation borehole 31. A gasket 41 seals the engine drive chamber 37 from chamber 23.

In contrast to the device with cylinder 4 according to FIGS. 2 or 3, the device according to FIG. 4 has the particular advantage that cylinder 4' can be extensively integrated in the fuel tank and no additional structural space is required. Moreover, due to communication between chamber 33 and the fuel tank 1, the capacity of the fuel tank is substantially unaffected.

In operation, membrane 19 is in the "measurement ready" position for measurement of fuel content in the tank and the "measurement ready" position of membrane 19 is detected by electronic control unit 16 through potentiometer 24 (FIGS. 1-3) or the final position switch 34 (FIG. 3).

Shut-off valve 15 is opened, so that the internal pressure of the fuel tank can be measured by pressure sensor 13 as a differential pressure with respect to the atmosphere. Atmospheric pressure, ambient temperature, and, fuel temperature are detected by sensors (not shown) of the engine control system (also not shown) and supplied to control unit 16.

At the beginning of measurement of the fuel content in the tank, shut-off valve 15 is closed and thus the reference pressure (atmospheric pressure at the beginning of measurement) applied to sensor 13 is preserved. Errors in measurement value due to changes in atmospheric pressure, for example, due to changes in elevation during measurement are thereby avoided. Electric motor 20 is activated by an output signal from control unit 16 and drives membrane 19 through step-down gear 25 in the direction to reduce the size of chamber 33. Chamber 23 is connected to the atmosphere by means of ventilation borehole 31. The fuel or air and fuel vapor stored in chamber 33 is moved out into the tank via borehole 36 until a preselected increase in the internal pressure of the tank is recorded by pressure sensor 13. In order to avoid dynamic effects, the time of displacement of the membrane 19 can be extended, as necessary, by forming ventilation borehole 31 as a throttling means or by limiting the speed of rotation of electric motor 20. After the preselected change in pressure has been reached, electric motor 20 is deactivated and the travel of membrane 19 is measured by potentiometer 24 and at the same time, the final value of the pressure change is measured on pressure sensor 13. Depending on the magnitude of the gas volume enclosed in the tank and the absolute pressure prevailing in the tank, as well as the tank temperature or a value representative thereof, which is derived, under certain conditions, from the fuel temperature determined by the engine control means, a specific relationship between the change of volume and pressure is determined according to the general equation of state for an ideal gas ($pv = MRT$). The content of liquid fuel in the tank can be determined by simple calculation from the calculation of the gas volume enclosed in the tank by subtracting the gas volume in the tank from the known total volume of the tank. The measurement and calculation of the content of fuel in the fuel tank is thus concluded. The result is indicated on display 18 and/or referred for other calculations, such as travel distance of the vehicle for the determined fuel content in the tank.

If the final position for measurement of the fuel content in the tank is maintained for a preselected period of time, then it may be concluded from the change in the internal pressure of the tank, the temperature in the fuel tank, and the gas volume enclosed in the fuel tank whether and to what extent there is any leakage from the fuel tank. If the leakage exceeds a permissible limiting value, this may also be indicated on display 18 and/or processed in another way, e.g., a diagnosis may be made upon re-ignition after a fuel stop of whether the tank closure cover 3 has been properly screwed on again and thus HC emissions from tank filling tube 2 are avoided.

After running the tank tightness test, membrane 19 is again brought to the initially described "measurement ready" position by electric motor 20, whereby chamber 33 is again filled with fuel or air and fuel vapor and measurement readiness is achieved.

The following operating program can be established advantageously for determining the fuel content in the tank in combination with control unit 16:

1. Establish "measurement readiness" by the potentiometer 24 or final position switch 34;
2. Establish internal tank pressure with respect to atmosphere in sensor 13;
3. Close valve 15;
4. Activate electric motor 20;
5. Allow displacement of the membrane 19 or the potentiometer 24 to take place to approximately 5% of its maximum possible displacement;
6. Set measurement time to zero and the values of the potentiometer and pressure sensor values for measurement start;
7. Measure changes in values of potentiometer 24 and pressure sensor 13;
8. Determine that the end of a change in potentiometer pressure sensor values or of a preselected amount of change which exceeds the start value has been obtained in the potentiometer value or pressure sensor value;
9. Deactivate the electric motor;
10. Determine measurement time, potentiometer value, and pressure sensor value in control unit 16;
11. Calculate the fuel content in the tank taking into account the actual atmospheric pressure and tank temperature based on the general equation of state for an ideal gas;
12. Producing an output signal representing fuel content and supplying the signal to the display 18 or for further processing;
13. Open valve 15 and activate the electric motor 20 to raise membrane 19 and return to its original "measurement ready" position;
14. Establish measurement readiness by the value of potentiometer 24 or final position switch 34 (as for 1).

As already indicated, the measurement process can be maintained over a further time span, and the change in internal tank pressure which is established, as the case may be, per unit of time, is evaluated as an indication of leakage of the fuel tank, which is produced by liquid/gas fuel leakage from the tank and its connection lines.

If, however, the device of the invention is utilized only for the diagnosis of tank tightness, the membrane displacement is produced by electric motor 20 up to a preselected amount of change from the start value of the potentiometer signal or pressure sensor signal, and then electric motor 20 is halted, and the membrane position is maintained for a further period of time, and the change in internal tank pressure which is established, as the case may be, per unit of time, is evaluated as indicative of when the fuel content of the fuel tank will be emptied.

Over and above this, it is advantageously provided that the measurement for determining when the content of the fuel tank will be emptied is correlated with the fuel consumption of the internal combustion engine which is calculated in control unit 16; also the measurement process can be conducted wholly, or only after the output signal is given indicating the content of liquid fuel in the tank, when the internal combustion engine is turned off. Of course, an operating program for the tank tightness diagnosis can also be established in control unit 16, whereby a permissible value for the pressure gradient may be established in control unit 16, from which an error signal will be emitted if this value is exceeded.

With the device of the invention for measuring the fraction of liquid fuel in a fuel tank, a solution can be realized with small structural space requirements, in which an arbitrary arrangement of cylinder 4 or of membrane chamber 33 is made possible directly on tank 1 above or below the fuel level.

It is understood that the activated charcoal tank 7 and thus the shut-off valve 15 and storage volume necessary for the provision of storing atmospheric pressure in pressure sensor 13 can be omitted.

However, under certain conditions, there is also the need for checking all of the fuel lines and fuel reservoirs for tightness and the operation of the activated charcoal regeneration within the scope of the on-board diagnosis.

Figure 5:
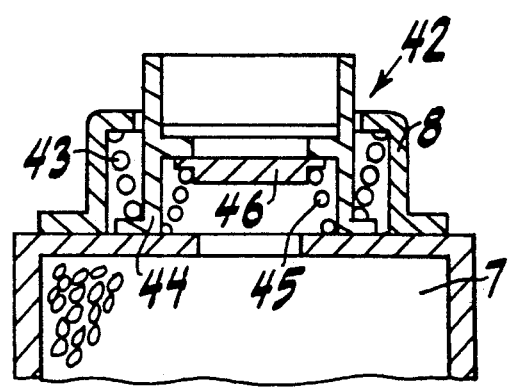
FIG. 5 shows another detail of FIG. 1.

For this purpose according to another embodiment of the invention, the connection 8 of activated charcoal tank 7 leading to the atmosphere has a double acting vent valve 42, which is shown in FIG. 5 and includes a first closing member 44 loaded by a spring 43 and a second closing member 46 loaded by a spring 45 and arranged inside first closing member 44, such that first closing member 44 opens connection 8 to the atmosphere, if overpressure prevails in activated charcoal tank 7, and second closing member 46 opens connection 8 to the atmosphere, if an underpressure prevails in activated charcoal tank 7. Tank vent tube 5 has in this case a shut-off valve 48.

The pressure in tank 1 is limited by the pressure relief valve 6, independently of the pressure in activated charcoal tank 7, whereby it is necessary that a bypass valve 47 arranged in tube 5 remains closed.

The functions of measuring tank content and tank tightness can be conducted with this device as previously explained.

According to the invention, a tightness check of the activated charcoal tank system is now also possible. For the duration of this test, shut-off valve 48 is closed. Of course, the arrangement of the pressure sensor 13 as previously indicated is necessary in order to obtain a pressure signal from the latter.

Only a tightness check of the total system including both the fuel tank and the activated charcoal tank system is possible without the use of shut-off valve 48.

When shut-off valve 48 is provided in the section of the connection tube 5 between cylinder 4 and the tank 1, the tightness check may be selectively conducted, as desired, only for the regeneration system, as will be described below.

Within the scope of another embodiment of the invention, electromagnetic shut-off valves (not shown) may be utilized in series and/or in parallel with the double-acting vent valve 42 in order to effect the sealing and venting functions instead, of the pressure springs 43 and 45.

In addition to the tightness check, according to the invention, a qualitative and quantitative check of the flow rate of the regenerating timing value 9 may also be conducted. For this purpose, the measurement process is changed such that after the tightness check (measurement of the pressure change during a predetermined time), the regenerating timing value 9 is again controlled and the flow rates established from the control pulses and the respective operating conditions are tested for their correctness by calculating the flow rate from the magnitude of the enclosed volume and the reduction in pressure and comparing it with the set value.

In the case of the tightness testing of the activated charcoal tank system and for measuring the flow rate of the regenerating timing value 9, it is only necessary to open bypass valve 47 and to close shut-off valve 48.

The measurement of the tightness of the entire fuel-vapor conducting system according to the invention and the checking of the flow rate of the regenerating timing value are particularly suitable for fulfilling the requirements of an "on-board diagnosis", as will probably be required in the future in the USA.

A tightness testing of the tank including the activated charcoal tank system can be produced with the device of the invention for a closed regenerating timing value 9.

If the activated charcoal tank system is to be tested separately, the measurement is conducted with timing value 9 and shut-off valve 48 closed, whereby the mentioned function of regenerating timing value 9 also may be tested under control of regenerating timing value 9 by calculating the flow rate from the magnitude of the enclosed volume and the decrease in pressure.

It goes without saying that for a simple embodiment of the invention, pressure relief valve 6 and bypass valve 47 may be omitted, and shut-off valve 48 may also be omitted if a separate testing of the individual regeneration system is dispensed with.

Without pressure relief valve 6, timing valve 9 must be closed during measurement with the device. For example, in a two minute measurement sequence, this can amount to a time fraction of 3–5% of the operating time. During this time there is no regeneration of activated charcoal tank 7, which under certain circumstances leads to an unacceptable deterioration in regeneration of the activated charcoal filter. In order to reduce the measurement sequence (number of measurements per unit of time) and to be able to realize the filling-state measurement continuously despite this, it is provided that an updating of the actual value of the tank content is produced by means of calculating in the control unit 16 the quantity of fuel supplied to the engine. Thus it is possible to greatly reduce the measurement sequence for the measurement of the filling state and/or to execute it only with the exclusion of all critical operating conditions, which leads to a reduction of the fraction of time without regeneration of the activated charcoal filter.

In the case of critical operating conditions, e.g., after filling the tank with fresh fuel in a heated vehicle or a large temperature increase in the tank and/or full loading of the activated charcoal filter, release of considerable quantities of highly volatile components (gasoline, alcohol) must be considered, and the admixture of vaporous fuel through timing value 9 with the intake air of the internal combustion engine can amount to 30% of the fuel quantity required by the internal combustion engine. In order not to adversely and unacceptably affect the lambda control during abrupt switching on or off of timing value 9, an adjustment of the amount of fuel injected can be conducted advantageously by coupling the algorithms of the filling state/tightness diagnosis and of the engine control or the on-board diagnosis. When connecting or disconnecting the control of timing valve 9, the magnitude of change in the fuel injection quantity may be advantageously derived from the deviation of the injection quantity existing prior to disconnection compared to its normal value.

While the invention has been described in relation to specific embodiments thereof, it will become apparent to those skilled in the art that numerous modifications and variations can be made within the scope and spirit of the invention as defined in the attached claims.

What is claimed is:

1. Apparatus for measuring the quantity of liquid fuel in a fuel tank for an internal combustion engine of a vehicle, said apparatus comprising a cylinder, a membrane in said cylinder dividing the cylinder into first and second chambers, means for connecting the first chamber to the fuel tank, means connecting the second chamber to the atmosphere, drive means acting on said membrane to produce displacement of the membrane in a direction to reduce the size of the first chamber, means for measuring displacement of said membrane from an initial defined position, to a displaced position produced by the drive means, sensor means for measuring gas pressure in a gas space in said fuel tank, means for closing communication of the fuel tank with ambient atmosphere during said measuring, the quantity of fuel in the fuel tank being determined from the pressure and displacement values measured, said drive means comprising an electric drive motor, a step-down transmission connected to said motor to be driven thereby, and a drive spindle mechanism drivingly connected to said transmission to produce displacement of the membrane in response thereto, a vent pipe connected to said fuel tank for venting the fuel tank to ambient atmosphere, said vent pipe including a first section connected to said first chamber and said fuel tank and a second section connected to ambient atmosphere and valve means for controlling communication between said first chamber and said second section of the vent pipe, said valve means comprising a valve member normally closing communication between said first chamber and said second section of said vent pipe, said valve member being openable in response to displacement of said membrane as produced by said spindle mechanism to provide communication between said first and second sections of said vent pipe.

2. Apparatus as claimed in claim 1, comprising means for venting the fuel tank to ambient atmosphere during engine operation.

3. Apparatus as claimed in claim 1, comprising a cam driven by said spindle mechanism to open said valve member.

4. Apparatus as claimed in claim 1, wherein said means for measuring displacement of said membrane comprises a potentiometer connected to said drive spindle mechanism to be driven by said spindle mechanism through one rotation upon displacement of said membrane to a maximum displaced position.

5. Apparatus as claimed in claim 1, comprising switch means for detecting the initial defined position of the membrane, said means for measuring displacement of said membrane comprising a potentiometer driven by said drive spindle mechanism through a number of rotations upon displacement of said membrane.

6. Apparatus as claimed in claim 1, comprising control means connected to said drive means, said means for measuring displacement of said membrane and said pressure sensor means to evaluate the fraction of liquid fuel in the fuel tank based on pressure and volume changes produced by displacement of the membrane and consequent determination of the gas space in the fuel tank from the general equation of state for an ideal gas.

7. Apparatus as claimed in claim 1, wherein said valve means further comprises a flexible seal means isolating said second chamber from said second section of the vent pipe and movable with said membrane for providing communication between said first chamber and said second section of the vent pipe when said valve member is open.

8. Apparatus as claimed in claim 7, wherein said spindle mechanism includes means for contacting and displacing said valve member to open position upon displacement of said membrane in a direction to increase the size of said first chamber.

9. Apparatus as claimed in claim 1, comprising a pressure relief valve in said second section of said vent pipe and an activated charcoal filter in said second section downstream of said pressure relief valve.

10. Apparatus as claimed in claim 9, comprising a by-pass connection connecting said second section of said vent pipe to said activated charcoal filter in parallel with said pressure relief valve and valve means in said by-pass connection.

11. Apparatus as claimed in claim 9, wherein said activated charcoal filter includes a connection to the atmosphere and a double acting vent valve in said connection which opens said connection to the atmosphere at predetermined positive and negative pressures in said filter.

12. Apparatus as claimed in claim 11, comprising a shut-off valve in said first section of the vent pipe, said pressure sensor means being in said second section of said vent pipe.

13. Apparatus as claimed in claim 11, wherein said pressure sensor means is in one of said sections of said vent pipe, and further comprising a connection pipe connecting said pressure sensor means to the atmosphere and valve means in said connection pipe.

14. A method of controlling apparatus for measuring the quantity of liquid fuel in a fuel tank for an internal combustion engine of a vehicle having a cylinder, a membrane in said cylinder dividing the cylinder into first and second chambers, means for connecting the first chamber to the fuel tank, means connecting the second chamber to the atmosphere, drive means acting on said membrane to produce displacement of the membrane in a direction to reduce the size of the first chamber, means for measuring displacement of said membrane from an initial defined position, to a displaced position produced by the drive means, sensor means for measuring gas pressure in a gas space in said fuel tank, means for closing communication of the fuel tank with ambient atmosphere during said measuring, the quantity of fuel in the fuel tank being determined from the pressure and displacement values measured, said drive means comprising an electric drive motor, a step-down transmission connected to said motor to be driven thereby, and a drive spindle mechanism drivingly connected to said transmission to produce displacement of the membrane in response thereto, and control means connected to said drive means, said means for measuring displacement of said membrane and said pressure sensor means to evaluate the fraction of liquid fuel in the fuel tank, said method comprising the steps of:

1. establishing a measurement readiness state by supplying the pressure in the tank to said pressure sensor means;
2. determining internal tank pressure with respect to ambient atmosphere from said pressure sensor means;
3. closing the pressure sensor means to ambient atmosphere;
4. activating the drive motor;
5. allowing displacement of the membrane to proceed to approximately 5% of its maximum possible displacement;
6. establishing measurement time at zero, the pressure at the pressure sensor means as an initial pressure value, and the displacement of the membrane as an initial displacement value when the membrane has been displaced to approximately 5% of its maximum possible displacement;
7. measuring changes in pressure and displacement values as the membrane is displaced;
8. determining that the changes in pressure and displacement values exceed the initial values;
9. deactivating the electric motor;
10. determining measurement time, membrane displacement values, and pressure sensor values;
11. calculating fuel content in the tank based on said values and the general equation of state of an ideal gas;
12. producing an output signal indicative of fuel content;
13. reconnecting the pressure sensor means to ambient atmosphere and driving the electric motor in reverse to return the membrane to is measurement readiness position; and
14. re-establishing a measurement readiness state as in step 1.

15. A method as claimed in claim 14, comprising supplying to said control means parameters representing actual atmospheric pressure and tank temperature for consideration in calculating fuel content in the tank.

16. A method as claimed in claim 14, wherein said drive motor displaces said membrane to a position, displaced by a predetermined amount, from said initial defined position whereafter said motor is deactivated and said membrane remains at its displaced position, said control means receiving signals from said pressure sensor means over a period of time and calculating from the latter signals when the fuel tank will become empty as a result of flow of fuel from said tank.

17. A method as claimed in claim 14, wherein said drive motor acts on said membrane in its displaced position to pressurize the fuel tank for a determined period of time, said control means receiving pressure values from said pressure sensor means and displacement values from said displacement measuring means, and evaluating when the fuel tank will become empty as a result of flow of fuel from the tank.

18. A method as claimed in claim 17, comprising supplying to said control means a signal representing fuel consumption by the engine, and subtracting in said control means the fuel consumption from the flow of fuel from the tank to determine fuel leakage.

19. A method as claimed in claim 18, comprising supplying to said control means a signal representing fuel consumption by the engine, and subtracting in said control means the fuel consumption from the flow of fuel from the tank to determine fuel leakage.

20. A method as claimed in claim 14, wherein said fuel tank is pressurized by displacement of said membrane to a displaced position, said control means receiving signals from said pressure sensor means with said fuel tank pressurized for a predetermined time period, said control means determining any reduction of fuel in said tank during said predetermined period of time.

21. A method as claimed in claim 20, comprising producing a signal if said reduction in fuel exceeds a predetermined amount.

22. A method as claimed in claim 20, comprising determining fuel reduction from engine fuel consumption and fuel leakage, and subtracting fuel consumption from fuel reduction to produce a signal representing fuel leakage form said tank.

23. A method as claimed in claim 20, comprising effecting the determination of fuel reduction in the tank after the engine is shut off and the fuel fraction in the tank has been indicated.

* * * * *